US008663748B2

(12) United States Patent
Akama et al.

(10) Patent No.: US 8,663,748 B2
(45) Date of Patent: Mar. 4, 2014

(54) METHOD OF PRODUCING A CONDUCTIVE ROLLER UTILIZING A SEMI-CURING STEP

(75) Inventors: Shuyou Akama, Saitama (JP); Hiroyuki Anzai, Mitaka (JP); Hiroyuki Kanesugi, Tokyo (JP); Koji Takagi, Kawasaki (JP)

(73) Assignee: Bridgestone Corporation, Tokyo (JP)

( * ) Notice: Subject to any disclaimer, the term of this patent is extended or adjusted under 35 U.S.C. 154(b) by 1193 days.

(21) Appl. No.: 11/663,626

(22) PCT Filed: Sep. 21, 2005

(86) PCT No.: PCT/JP2005/017386

§ 371 (c)(1), (2), (4) Date: Mar. 26, 2008

(87) PCT Pub. No.: WO2006/033353

PCT Pub. Date: Mar. 30, 2006

(65) Prior Publication Data

US 2008/0220179 A1 Sep. 11, 2008

(30) Foreign Application Priority Data

| | | | |
|---|---|---|---|
| Sep. 22, 2004 | (JP) | ................................ | 2004-275355 |
| Dec. 2, 2004 | (JP) | ................................ | 2004-350091 |
| Dec. 2, 2004 | (JP) | ................................ | 2004-350106 |
| Dec. 2, 2004 | (JP) | ................................ | 2004-350175 |

(51) Int. Cl.
*C08F 2/46* (2006.01)

(52) U.S. Cl.
USPC ........... 427/487; 427/508; 399/159; 399/176; D18/58; 430/66; 430/97; 430/129; 430/132; 347/101; 347/102

(58) Field of Classification Search
USPC ............ 427/487, 508; 399/159, 176; D18/58; 430/66, 97, 129, 132; 347/101, 102
See application file for complete search history.

(56) References Cited

U.S. PATENT DOCUMENTS

| | | | | |
|---|---|---|---|---|
| 5,625,858 | A * | 4/1997 | Hirai et al. | 399/176 |
| 5,868,839 | A | 2/1999 | Kato et al. | |
| 6,660,399 | B1 * | 12/2003 | Kitano et al. | 428/500 |
| 6,902,266 | B2 * | 6/2005 | Kaga et al. | 347/104 |
| 2004/0121253 | A1 * | 6/2004 | Chen et al. | 430/97 |
| 2004/0170449 | A1 * | 9/2004 | Sakata et al. | 399/286 |
| 2004/0224245 | A1 * | 11/2004 | Shigezaki et al. | 430/66 |

FOREIGN PATENT DOCUMENTS

| | | | |
|---|---|---|---|
| JP | 2-284674 | A | 11/1990 |
| JP | 8-50425 | A | 2/1996 |
| JP | 2665795 | B2 | 6/1997 |
| JP | 11-223989 | A | 8/1999 |
| JP | 2001-062380 | A | 3/2001 |
| JP | 2001-62380 | A | 3/2001 |
| JP | 2002-319192 | A | 10/2002 |
| JP | 2004-191637 | A | 7/2004 |
| JP | 2004-202452 | A | 7/2004 |
| JP | 2004191637 | * | 7/2004 |
| JP | 2004-258421 | A | 9/2004 |

OTHER PUBLICATIONS

Chinese Office Action dated May 9, 2008 (with English Translation).

* cited by examiner

*Primary Examiner* — Charles Boyer
(74) *Attorney, Agent, or Firm* — Sughrue Mion, PLLC

(57) ABSTRACT

In the formation of a conductive roller 1, a compound forming an elastomer by curing through an electron beam irradiation or a ultraviolet ray irradiation is applied onto an outside of a shaft member 2 to form an elastomeric coating layer 3R and then the elastomeric coating layer is cured through an irradiation of an electron beam or a ultraviolet ray to form an elastic layer, whereby the elastic layer can be formed cheaply without sacrificing precision of peripheral dimension to largely reduce the cost of the conductive roller.

9 Claims, 13 Drawing Sheets

(a)

(b)

METHOD OF PRODUCING A CONDUCTIVE ROLLER UTILIZING A SEMI-CURING STEP

TECHNICAL FIELD

This present invention relates to a conductive roller used in an imaging apparatus such as an electrophotographic device or an electrostatic recording device, e.g. a copier, a printer or the like, and more particularly to a conductive roller improving the productivity in the production thereof and simultaneously reducing the cost.

RELATED ART

In the imaging apparatus using the electrophotographic system such as a copier, a printer or the like are used various conductive rollers, an example of which includes a charging roller for giving an electric charge to a latent image support such as a photosensitive drum or the like, a developing roller for feeding a non-magnetic developing agent (toner) to the latent image support to visualize a latent image on the latent image support, a toner feed roller for feeding the toner to the developing roller, a transfer roller used for transferring the toner on the latent image support to a recording medium such as a paper or the like, a middle transfer roller serving as an intermediary of the toner, a cleaning roller for removing the toner left on the latent image support, a belt driving roller for driving or drive-supporting a conductive belt used in the imaging apparatus and the like.

As such a conductive roller, there have hitherto been used rollers formed by forming a conductive elastic layer, which is made from a conductive rubber, a high molecular weight elastomer, a high molecular weight foam or the like having an electric conductivity by compounding with an electrically conducting agent, on an outer periphery of a conductive shaft member, or further forming a film of a coating layer on an outer periphery thereof, if necessary.

As a method of forming the elastic layer is usually used a shaping method wherein the materials are poured into a mold having a high precision and cured therein because a peripheral dimension is required in a higher precision.

Patent Document 1: JP-A-2004-150610.

DISCLOSURE OF THE INVENTION

Problems to be Solved by the Invention

In the method using the mold, however, if it is intended to increase the production volume, it is required to use a plurality of expensive molds, and hence the installation cost becomes vast, which poses an impediment in the cost reduction of the product.

In view of the above problems, it is an object of the invention to provide a conductive roller capable of cheaply forming an elastic layer without sacrificing a dimension precision of an outer periphery to largely reduce a product cost.

Means for Solving Problems

<1> A method of producing a conductive roller comprising a shaft member axially bearing at both end portions in its longitudinal direction and one or more elastic layers arranged outside in a radial direction thereof, which comprises applying a compound forming an elastomer by curing through an electron beam irradiation or a ultraviolet ray irradiation onto an outside of the shaft member to form an elastomeric coating layer and then curing the elastomeric coating layer through an irradiation of an electron beam or a ultraviolet ray to form an elastic layer.

<2> A method of producing a conductive roller according to item <1>, wherein the compound is discharged through a discharge head of a die coater onto the shaft member while rotating the shaft member to form the elastomeric coating layer.

<3> A method of producing a conductive roller according to item <2>, wherein the die coater has a discharge head having a length shorter than that of the elastomeric coating layer and at least one of the discharge head and the shaft member is relatively displaced in the longitudinal direction of the shaft member to form the elastomeric coating layer.

<4> A method of producing a conductive roller according to item <2> or <3>, wherein at least one of the shaft member and a layer-regulating means regulating in contact with the elastomeric coating layer formed by the die coater before the curing while rotating the shaft member is relatively displaced in the longitudinal direction of the shaft member to adjust a thickness and a surface smoothness of the elastomeric coating layer to predetermined values.

<5> A method of producing a conductive roller according to item <4>, wherein the layer-regulating means is a discharge head being at a state of stopping a discharge of the compound after the elastomeric coating layer is formed over a full length by discharging the compound through the discharge head of the die coater, and at least one of the layer-regulating means and the shaft member is relatively displaced in the longitudinal direction of the shaft member to adjust a thickness and a surface smoothness of the elastomeric coating layer to predetermined values.

<6> A method of producing a conductive roller according to item <4>, wherein the layer-regulating means is a thing attached to the discharge head.

<7> A method of producing a conductive roller according to item <4>, wherein the layer-regulating means is a thing separately disposed from the discharge head, and the formation of the elastomeric coating layer and the layer regulation of the elastomeric coating layer formed are continuously conducted as the shaft member is rotated.

<8> A method of producing a conductive roller according to any one of items <1> to <7>, wherein when the elastomeric coating layer is cured by irradiating the electron beam or the ultraviolet ray, an apparatus for irradiating the electron beam or the ultraviolet ray is relatively displaced to the shaft member in the longitudinal direction while rotating the shaft member to semi-cure the elastomeric coating layer, and then the elastomeric coating layer is full-cured at a rest step in the step of forming the elastomeric coating layer, and the semi-curing of the elastomeric coating layer is continuously conducted with the application of the elastomeric coating layer while rotating the shaft member.

<9> A method of producing a conductive roller according to any one of items <1> to <8>, wherein a paint curing through the electron beam irradiation or the ultraviolet ray irradiation is applied onto the surface of the elastomeric coating layer to form a coating applied layer, and the electron beam or the ultraviolet ray is irradiated to the coating applied layer to form a cured coating layer.

<10> A method of producing a conductive roller according to item <9>, wherein the coating applied layer is formed by crossing a coating roll of a roll coater with a forming conductive roller at a predetermined angle inclusive of 90° at a posture of contacting or approaching peripheral faces of both the rollers with each other while feeding the paint onto the peripheral face of the coating roll and relatively displacing at least one of the coating roll and the forming conductive roller to the other in a longitudinal direction of the conductive roller while rotating both the coating roll and the forming conductive roller.

<11> A method of producing a conductive roller according to item <10>, wherein a gravure roll is used as the coating roll.

<12> A method of producing a conductive roller according to any one of items <9> to <11>, wherein when the coating applied layer is cured by irradiating the electron beam or the ultraviolet ray, an apparatus for irradiating the electron beam or the ultraviolet ray is relatively displaced to the forming conductive roller in the longitudinal direction while rotating the forming conductive roller to semi-cure the coating applied layer, and then the coating applied layer is full-cured at a rest step in the step of forming the coating applied layer, and the semi-curing of the coating applied layer is continuously conducted with the application of the coating applied layer while rotating the shaft member.

<13> A method of producing a conductive roller according to any one of items <1> to <12>, wherein a metal pipe, or a hollow cylindrical body or a solid cylindrical body of a resin containing an electrically conducting agent is used as the shaft member.

Effect of the Invention

According to item <1>, the compound forming an elastomer by curing through an electron beam irradiation or a ultraviolet ray irradiation is applied onto the outside of the shaft member to form the elastomeric coating layer and then the elastomeric coating layer is cured through the irradiation of an electron beam or a ultraviolet ray to form the elastic layer, so that it is needless to use a mold posing an impediment in the cost reduction but also it is needless to conduct the drying step required in case of using a paint not containing a ultraviolet-curing resin, which can contribute to largely reduce the product cost.

According to item <2>, the die coater capable of forming the layer only by at least one rotation of the shaft member is used, so that the elastomeric coating layer having a desired thickness can be formed efficiently and the thickness of the layer can be made uniform.

According to item <3>, the die coater having a discharge head of a length shorter than that of the elastomeric coating layer is used and the discharge head is relatively displaced to the shaft member in the longitudinal direction to form the elastomeric coating layer, so that the compound can be spirally applied onto the shaft member. If a die coater having a discharge head of a length longer than that of the elastomeric coating layer is used so as not to relatively displace to the shaft member in the longitudinal direction, a departure line when the conductive roller provided with the elastomeric coating layer is separated away from the discharge head retains on the elastomeric coating layer and hence the layer thickness become non-uniform.

According to item <4>, the layer-regulating means regulating in contact with the elastomeric coating layer formed by the die coater before the curing while rotating the shaft member is relatively displaced in the longitudinal direction of the shaft member, so that the thickness and surface smoothness of the elastomeric coating layer can be adjusted to desired values.

According to item <5>, the discharge head being at a state of stopping the discharge is used as the layer-regulating means, so that it is not required to invest a new apparatus for regulating the layer.

According to item <6>, the thing attached to the discharge head is used as the layer-regulating means, so that it is useless to arrange a new reciprocating displacement apparatus for displacing the discharge head and the layer-regulating means in the longitudinal direction of the roller and hence the apparatus can be simplified.

According to item <7>, the thing separately arranged from the discharge head is used as the layer-regulating means to continuously conduct the formation of the elastomeric coating layer and the layer regulation of the formed elastomeric coating layer while rotating the shaft member, so that the formation of the elastomeric coating layer and the layer regulation of the formed elastomeric coating layer can be conducted efficiently.

According to item <8>, the apparatus for irradiating the electron beam or the ultraviolet ray is relatively displaced to the shaft member in the longitudinal direction while rotating the shaft member to semi-cure the elastomeric coating layer and then the elastomeric coating layer is full-cured at the rest step in the step of forming the elastomeric coating layer, so that the shape of the conductive roller is prematurely stabilized and the curing can be completely attained, and also the semi-curing of the elastomeric coating layer is continuously conducted with the application of the elastomeric coating layer while rotating the shaft member, and hence it can be carried out efficiently.

According to item <9>, the coating applied layer formed on the elastic layer by the application of the paint is cured by irradiating the electron beam or the ultraviolet ray, so that it is needless to use a mold posing an impediment in the cost reduction but also it is needless to conduct the drying step, which can more contribute the reduce the product cost.

According to item <10>, the coating applied layer is formed by rotating the coating roll of the roll coater and the forming conductive roller while feeding the paint onto the peripheral face of the coating roll, so that the forming step can be made efficient without wastefully using the paint. Further, at least one of the coating roller and the forming conductive roller is relatively displaced to the other in the longitudinal direction of the conductive roller at a posture of crossing the coating roll with the forming conductive roller at a predetermined angle inclusive of 90° and contacting or approaching peripheral faces of both the rollers with each other, so that the formation of the departure line can be suppressed when the coating roll is separated away from the forming conductive roller paint and there can be prevented the non-uniform state of the surface due to the departure line.

According to item <11>, the gravure roll of receiving the paint in concave portions formed on the peripheral face and transporting it is used as the coating roll, so that the amount of the paint kept on the peripheral face can be made constant even if the viscosity of the paint somewhat changes, and hence the thickness of the coating applied layer can be made uniform.

According to item <12>, the coating applied layer is full-cured at a rest step in the step of forming the coating applied layer after the coating applied layer is semi-cured, and the semi-curing of the coating applied layer is continuously conducted with the application of the coating applied layer while rotating the shaft member, so that the shape of the conductive roller is prematurely stabilized and the curing can be completely attained as previously mentioned on the elastic layer.

According to item <13>, the metal pipe, or the hollow cylindrical body or solid cylindrical body of the resin containing the electrically conducting agent is used as the shaft member, so that the weight of the conductive roller can be reduced.

DESCRIPTION OF REFERENCE SYMBOLS

Figure 1:
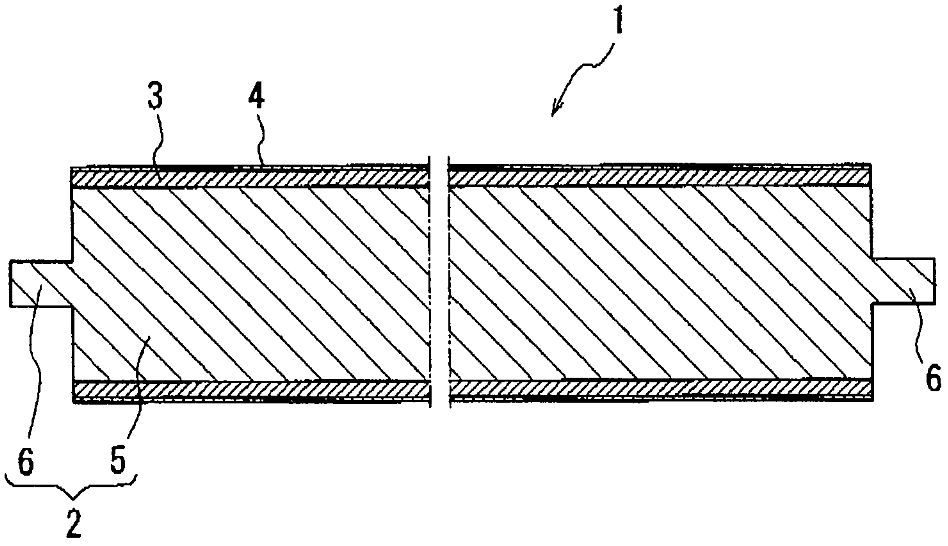
FIG. 1 is a section view of an embodiment of the conductive roller according to the invention.

1 conductive roller
2 shaft member
3 elastic layer
4 coating layer
5 solid cylindrical body
6 shaft portion
7 gear portion
8 shaft-receiving hole portion
11 conductive roller
12 shaft member
13 hollow cylindrical body
13*a* cylindrical portion
13*b* bottom portion
14 cap member
14*a* lid portion
21 conductive roller
22 shaft member
23 hollow cylindrical body
23*a* cylindrical portion
23*b* bottom portion
24 cap member
24*a* lid portion
30 mold
31 cylindrical mold segment
32 core mold segment
33 runner mold segment
34 second spray
35 cavity
36 first spray
37 runner
51 conductive roller
52 shaft member
53 hollow cylindrical body
54 cylindrical member
55 reinforcing rib
56 metal shaft
57 gear portion
61A end portion of cylindrical member
61B other end portion of cylindrical member
62 convex portion
63 rotating stop pin
65 concave portion
66 rotating stop hole
70 die coater
71 upper die head
72 lower die head
73 feed pipe
74 discharge head
76 constant-volume pump
77 opening portion
78 ultraviolet ray irradiation means or electron beam irradiation means
79, 79A layer-regulating means
80 roll coater
81 coating roll (gravure roll)
81*a* peripheral face of gravure roll
81*b* both end portions of gravure roll
81*c* concave portion of gravure roll
82 paint tank
84 roll-driving motor
86 doctor blade
88 ultraviolet ray irradiation means or electron beam irradiation means

BEST MODE FOR CARRYING OUT THE INVENTION

An embodiment of the invention will be described in detail. FIG. 1 is a section view of a conductive roller formed by a method of producing a conductive roller according to the invention. The conductive roller 1 comprises an elastic layer formed outside a shaft member 2, and preferably comprises a coating layer 4 further formed thereon.

At first, the shaft member 2 is described below. Since the shaft member 2 is made from a resin, the diameter of the shaft member 2 can be made large without causing the significant increase of the weight. Also, since the resin contains an electrically conducting agent, the shaft member 2 has a good electrical conductivity, which can give a desired potential to the surface of the conductive roller 1.

A material of the resin used in the shaft member 2 is not particularly limited as far as it has a proper strength and can be shaped by an injection molding or the like, and can be properly selected from general-purpose resins and engineering plastics. As the engineering plastic may be concretely mentioned polyacetal, a polyamide resin (e.g. polyamide 6, polyamide 6,6, polyamide 12, polyamide 4,6, polyamide 6,10, polyamide 6,12, polyamide 11, polyamide MXD6 (polyamide obtained from metaxylylene diamine and adipic acid) or the like), polybutylene terephthalate, polyphenylene oxide, polyphenylene ether, polyphenylene sulfide, polyether sulfon, polycarbonate, polyimide, polyamidoimide, polyether imide, polysulfon, polyether ether ketone, polyethylene terephthalate, polyarylate, liquid crystal polymer, polytetrafluoroethylene and so on. As the general-purpose resin are mentioned polypropylene, acrylonitrile-butadiene-styrene (ABS) resin, polystyrene, polyethylene and so on. Further, melamine resin, phenolic resin, silicone resin and the like may also be used. These resins may be used alone or in a combination of two or more.

Among them, the engineering plastics are preferable, and polyacetal, polyamide resin, polybutylene terephthalate, polyphenylene ether, polyphenylene sulfide, polycarbonate and the like are further preferable in view that they are thermoplastic and excellent in the formability and the mechanical strength. Particularly, polyamide 6,6, aromatic polyamide, polyamide 6,12, polybutylene terephthalate and a mixed resin thereof are preferable. Although the use of thermosetting resins is permitted, it is preferable to use the thermoplastic resin in view of the recycling property.

As the electrically conducting agent, it is possible to use various ones as far as they can be uniformly dispersed into the resin material, but it is preferable to use carbon black powder, graphite powder, carbon fiber, powder of a metal such as aluminum, copper, nickel or the like, powder of a metal oxide such as tin oxide, titanium oxide, zinc oxide or the like, and a powdery conducting agent such as conductive glass powder or the like. They may be used alone or in a combination of two or more. The amount of the electrically conducting agent added may be selected so as to provide a proper resistance value in accordance with the application and condition of the conductive roller to be targeted and is not particularly limited, but it is usually 5-40 weight %, preferably 5-20 weight % based on the whole material of the shaft member 2.

The volume resistivity of the shaft member 2 may be properly selected in accordance with the application or the like of the roller as mentioned above, but is usually $1\times10^{0}$-$1\times10^{12}$ Ω·cm, preferably $1\times10^{2}$-$1\times10^{10}$ Ω·cm, more preferably $1\times10^{5}$-$1\times10^{10}$ Ω·cm.

The material of the shaft member 2 may be compounded with various conductive or non-conductive fibrous material, whisker, ferrite and the like for the purpose of reinforcement, weight increase or the like, if necessary. As the fibrous material may be mentioned fibers such as carbon fiber, glass fiber and the like. As the whisker may be mentioned an inorganic whisker of potassium titanate or the like. They may be used alone or in a combination of two or more. The amount compounded may be properly selected in accordance with the length and size of the fibrous material or whisker used, kind of the main resin material, strength of the roller to be targeted and the like, but is usually 5-70 weight %, particularly 10-20 weight % based on the whole material.

Since the shaft member 2 constitutes a core portion of the conductive roller 1, it is required to have a strength enough to stably develop good performances as the roller. The strength is usually not less than 80 MPa, particularly not less than 130 MPa as a bending strength according to JIS K7171, whereby the good performances can be surely developed over a long time of period. Moreover, the upper limit of the bending strength is not particularly limited, but is generally not more than about 500 MPa.

Figure 2:
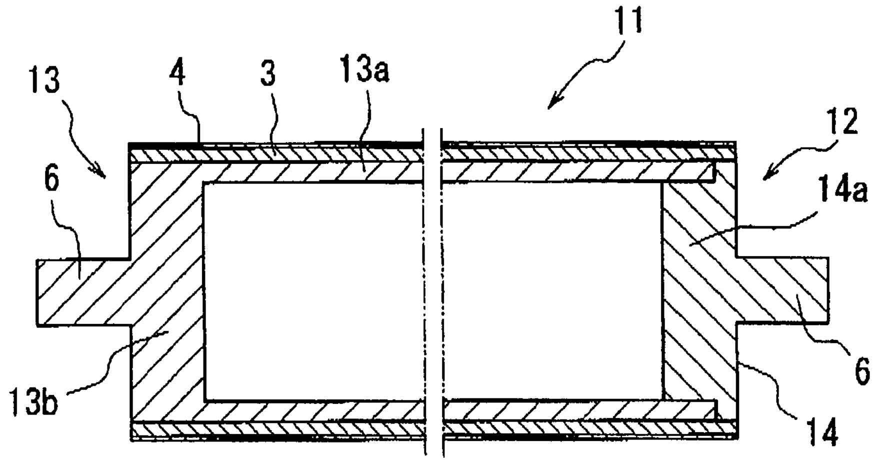
FIG. 2 is a section view of another embodiment of the conductive roller.

Although FIG. 1 shows a solid cylindrical body 5 as the shaft member 2, FIG. 2 is a section view of a conductive roller 11 using a shaft member 12 made from a hollow cylindrical body 13 of a resin instead of the shaft member 2. The conductive roller 11 is the same as the conductive roller 1 in a point that the elastic layer 3 and the coating layer 4 are formed outside the shaft member 12 in this order. The shaft member 12 is formed by bonding a hollow cylindrical body 13 to a cap member 14 through adhesion or the like, in which the hollow cylindrical body 13 comprises a cylindrical portion 13*a*, a bottom portion 13*b* and a shaft portion 6 and the cap member 14 comprises a lid portion 14*a* and a shaft portion 6. Both the shaft portions 6 are born by a roller support portion of an electrophotographic apparatus not shown at an attached state.

By using the hollow shaft member 12 instead of the shaft member 2 can be more reduced the weight of the conductive roller 11. Particularly, when the outer diameter of the conductive roller exceeds 12 mm, it is preferable to have a hollow structure.

Figure 3:
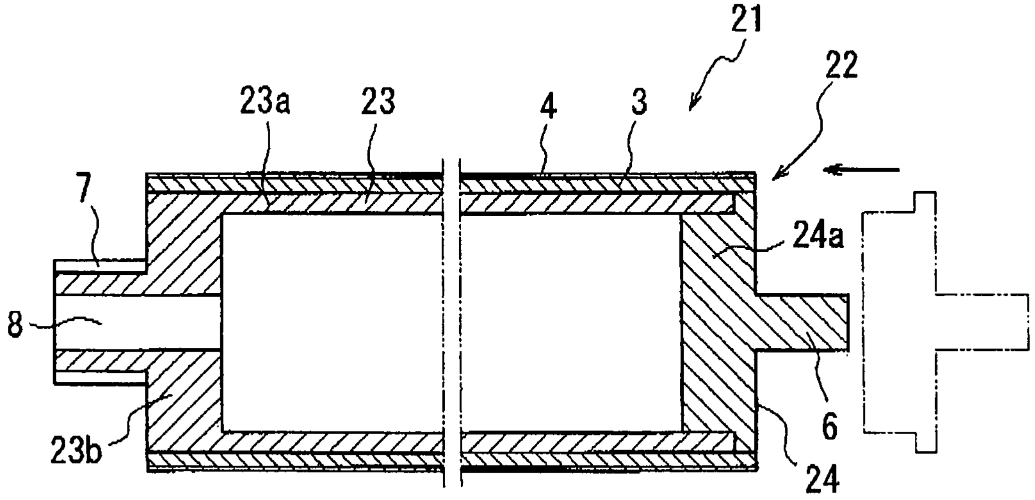
FIG. 3 is a section view of the other embodiment of the conductive roller.
Figure 4:
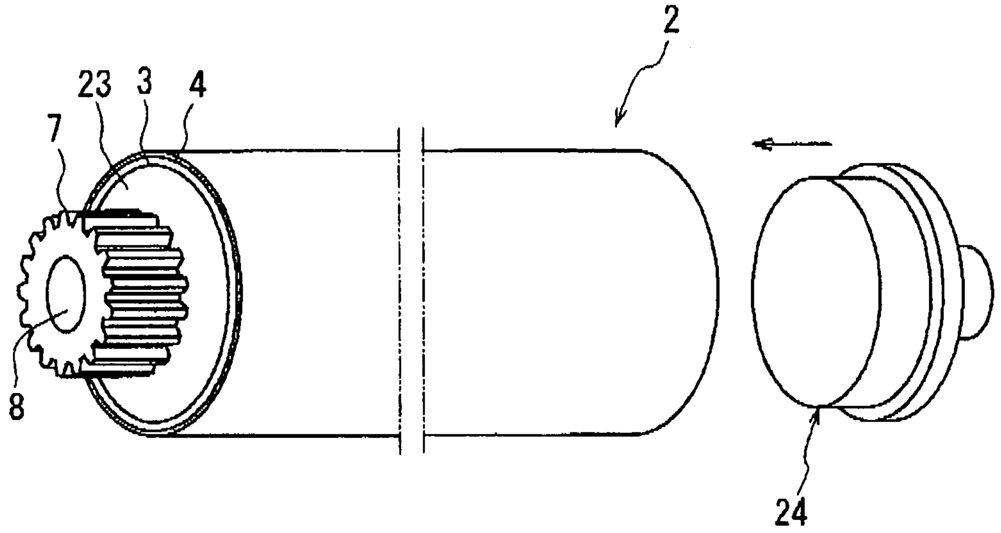
FIG. 4 is a perspective view of a still further embodiment of the conductive roller.

Further, FIG. 3 is a section view of a conductive roller 21 using a shaft member 22 instead of the shaft member 12, and FIG. 4 is a perspective view thereof. The shaft member 22 is formed by bonding a hollow cylindrical body 23 to a cap member 24 through adhesion or the like, in which the hollow cylindrical body 23 comprises a cylindrical portion 23*a*, a bottom portion 23*b*, a gear portion 7 and a shaft-receiving hole portion 8 and the cap member 24 comprises a lid portion 24*a* and a shaft portion 6 likewise the conductive roller 11.

The shaft portion 6 and the shaft-receiving hole portion are born by a roller support portion of an electrophotographic apparatus not shown, and the rotation driving force of the conductive roller is directly transferred to the shaft member 22 through the gear portion 7. Even in the hollow cylindrical body 23 having such a gear portion 7, the shaft member 22 is made from the resin and can be integrally shaped by an injection molding or the like, so that the cost of the shaft member 22 can be reduced as compared with the case that the shaft member 22 is made from a metal and the gear portion should be a separate member. Moreover, the gear portion 7 may be integrally shaped even if it is a spur gear or a spiral gear.

Also, the thickness of the hollow cylindrical body 13*a* or 23*a* is preferable to be thin in view of the weight reduction as far as the strength is sufficient. The thickness may be 0.3-3 mm, preferably 1-2 mm.

The method of forming the shaft members 2, 12, 22 with the compounded material comprising the aforementioned resin material, electrically conducting agent and the like is not particularly limited and may be properly selected from the well-known shaping methods in accordance with the kind of the resin material and the like, but the injection molding method using the mold is usually applied.

Figure 5:
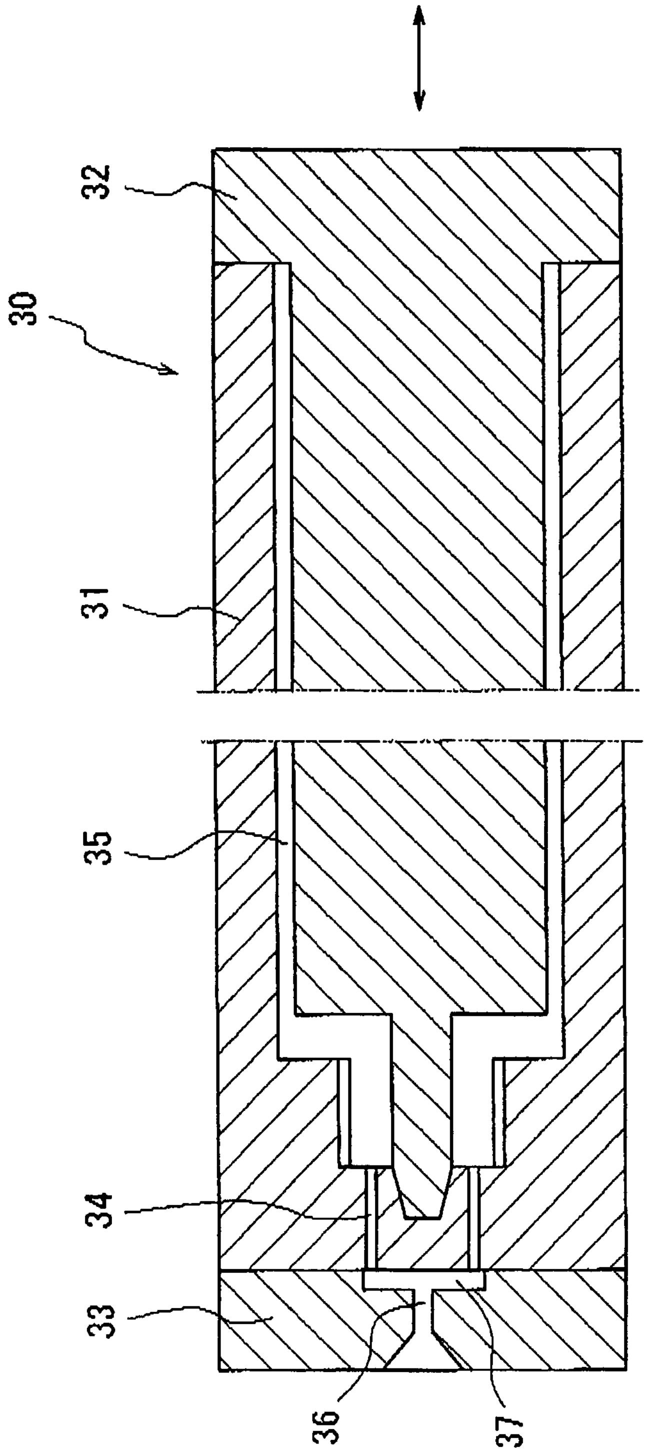
FIG. 5 is a section view of a mold forming a hollow cylindrical body.

FIG. 5 is a section view of a mold 30 forming the hollow cylindrical body 23 at a closed state. The mold 30 comprises a cylindrical mold segment 31, a core mold segment 32 and a runner mold segment 33. The opening and closing of the mold is carried out by separating away and approaching these mold segments to each other in a longitudinal direction of the cylindrical mold segment 31. At the closed state of the mold 30, a resin is poured into a cavity 35 defined by the cylindrical mold segment 31 and the core mold segment 32 from a first sprue 36 through a runner 37 and a second sprue 34, and thereafter cooled and solidified in the mold 30 to form the hollow cylindrical body 23. Also, the material in the runner 37 can be laconically utilized by using a hot runner system.

At this moment, the cylindrical mold segment 31 and the core mold segment 32 have a structure not divided in the peripheral direction, so that the hollow cylindrical body 23 may be made uniform in the peripheral direction. Also, the hollow portion can be formed by a pressure of an inert gas introduced instead of using the core mold segment 32.

Figure 6:
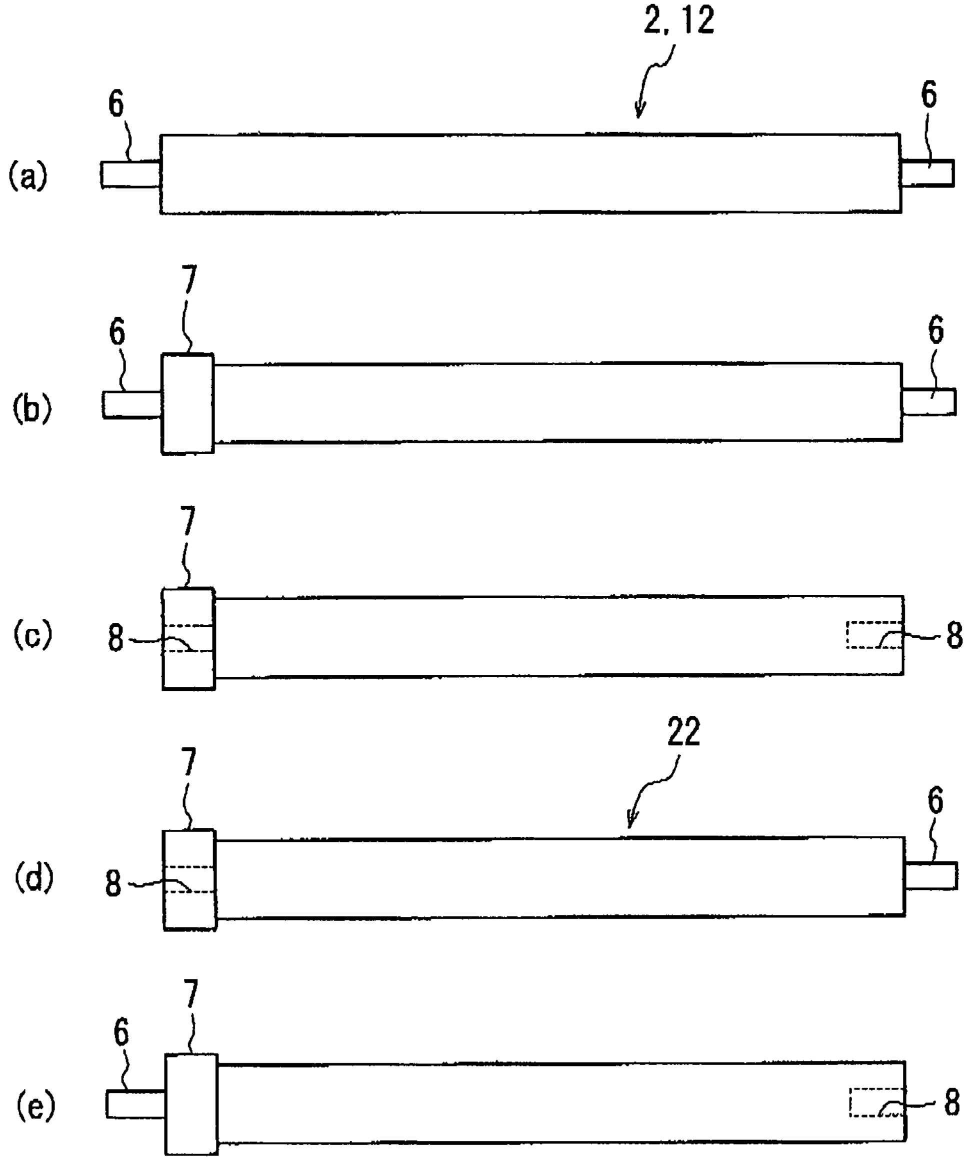
FIG. 6 is a side view of a shaft member having end portions of different structures.

FIG. 6 is a side view of a shaft member having different end portion structure, in which FIGS. 6(*a*) and 6(*b*) are an example that both the end portions are constituted with the shaft portion 6, FIG. 6(*c*) is an example that both the end portions are constituted with the shaft-receiving hole portion 8, and FIGS. 6(*d*) and 6(*e*) are an example that one of both the end portions is constituted with the shaft portion 6 and the other is constituted with the shaft-receiving hole portion 8. Also, the examples of FIGS. 6(*b*)-6(*e*) show an example that the one end portion is provided with the gear portion 7. In addition, the gear portions 7 may be arranged on both the end portions, and in this case the shaft member bear the function of mediating the power transmission. In any case, the gear portion 7 can be integrally formed with the cylindrical portion or columnar portion.

The shaft member shown in FIG. 6(*a*) corresponds to the shaft member 2 or 12, and that shown in FIG. 6(*d*) corresponds to the shaft member 22.

Figure 7:
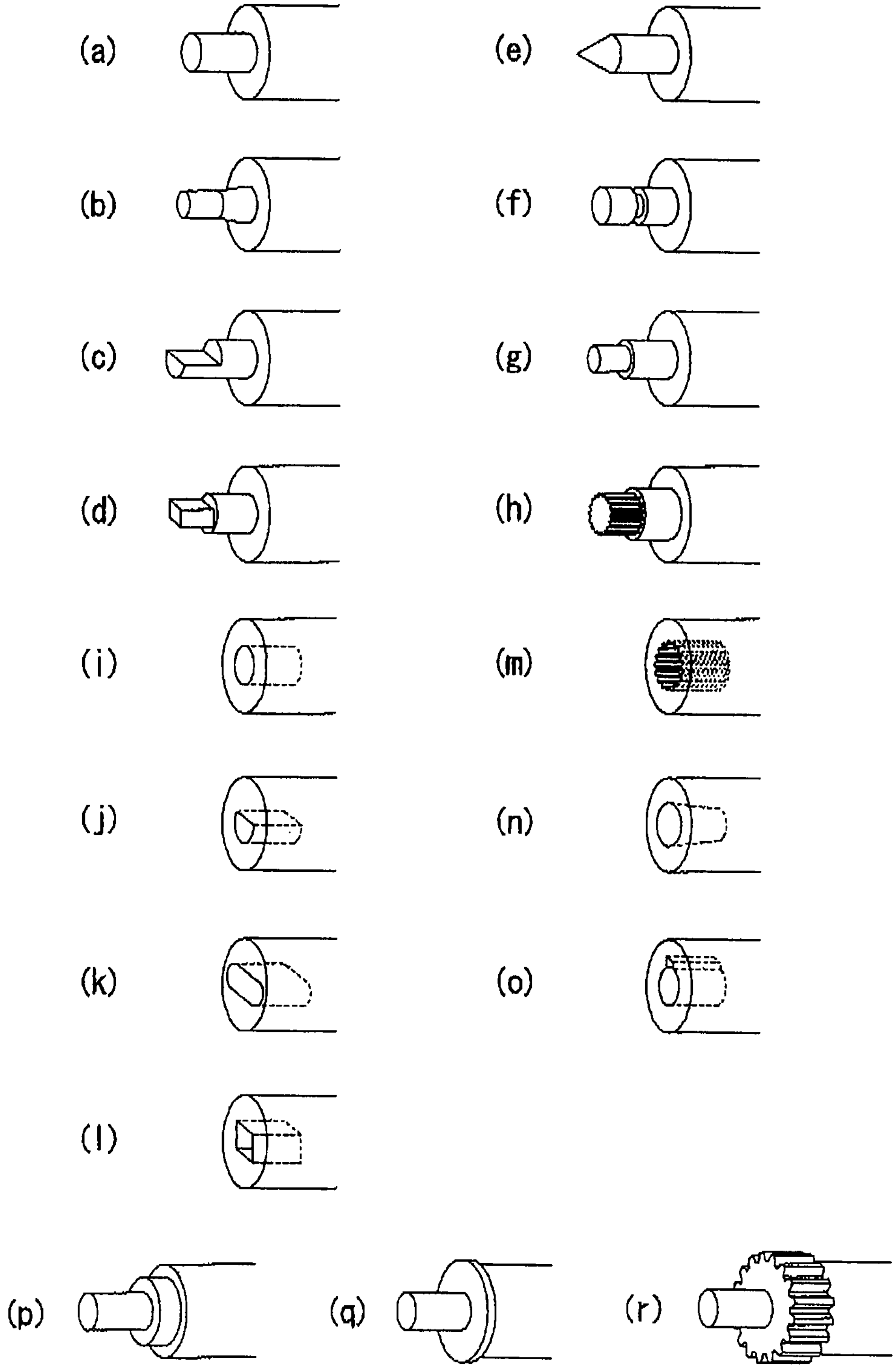
FIG. 7 is a perspective view illustrating shape-modified examples of a shaft portion, a bearing portion and a gear portion.

Also, the shaft portion 6 of the shaft member 2, 12 shown in FIG. 6 has a simplest cylindrical form as shown by a perspective view in FIG. 7(*a*). Instead, there can be used a tapered portion shown in FIG. 7(*b*), a D-cut worked portion shown in FIG. 7(*c*), a prismatic portion shown in FIG. 7(*d*), a top-pointed portion shown in FIG. 7(*e*), an annular groove-containing portion shown in FIG. 7(*f*), a stepped portion shown in FIG. 7(*g*), a portion having on its outer peripheral face a spline or outer tooth for gear shown in FIG. 7(*h*) and the like. Similarly, as the shaft-receiving hole portion 8, there can be used a simple round-shaped hole portion shown by a perspective view in FIG. 7(*i*), a D-shaped sectional hole portion shown in FIG. 7(*j*), an oval sectional hole portion shown in FIG. 7(*k*), a square hole portion shown in FIG. 7(*l*), a portion having in its inner peripheral face a spline or inner tooth for gear shown in FIG. 7(*m*), a tapered hole portion shown in FIG. 7(*n*), a key-grooved round hole portion shown in FIG. 7(*o*) and the like.

Further, a stepped portion shown in FIG. 7(*p*), a flanged portion shown in FIG. 7(*q*) and the like can be used instead of the gear portion 7 shown by a perspective view in FIG. 7(*r*).

Figure 8:
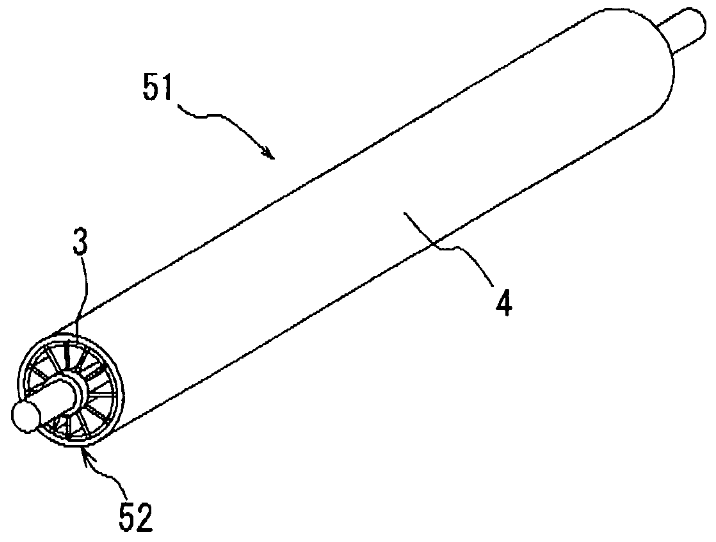
FIG. 8 is a perspective view of a further embodiment of the conductive roller.
Figure 9:
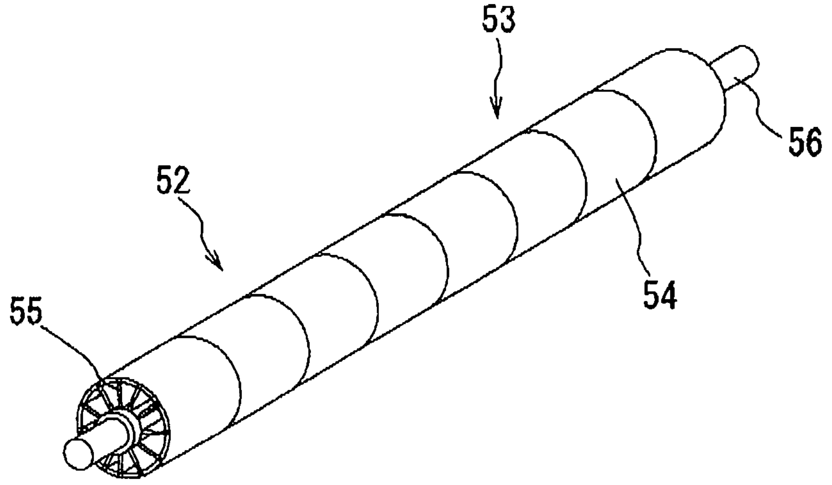
FIG. 9 is a perspective view of a shaft member in the conductive roller of FIG. 8.

FIG. 8 is a perspective view of a conductive roller 51 using a shaft member 52 instead of the shaft member 12 shown in FIG. 2, and FIG. 9 is a perspective view of the shaft member 52. The shaft member 52 comprises a hollow cylindrical body 53 and a metal shaft 56. The hollow cylindrical body 53 is provided with reinforcing ribs 55 extending inward from the outer peripheral surface in the radial direction. Also, the hollow cylindrical body 53 is constructed by connecting a plurality of cylindrical members 54 to each other in the longitudinal direction. Thus, the hollow cylindrical body 53 is comprised of plural cylindrical members 54 and divided in the longitudinal direction, so that the length of each member becomes short as compared with the conventional case of the integrally united product of the metal pipe and the resin, and hence the working precision can be improved but also the working of each member can be made easy and contribute to the improvement of the productivity.

In the radial center of the hollow cylindrical body 53 is arranged the metal shaft 56 passing through the hollow cylindrical body, and radially inner ends of the reinforcing ribs 55 are supported by the metal shaft 56, so that the rigidity of the roller can be enhanced to increase the strength to bending.

Figure 10:
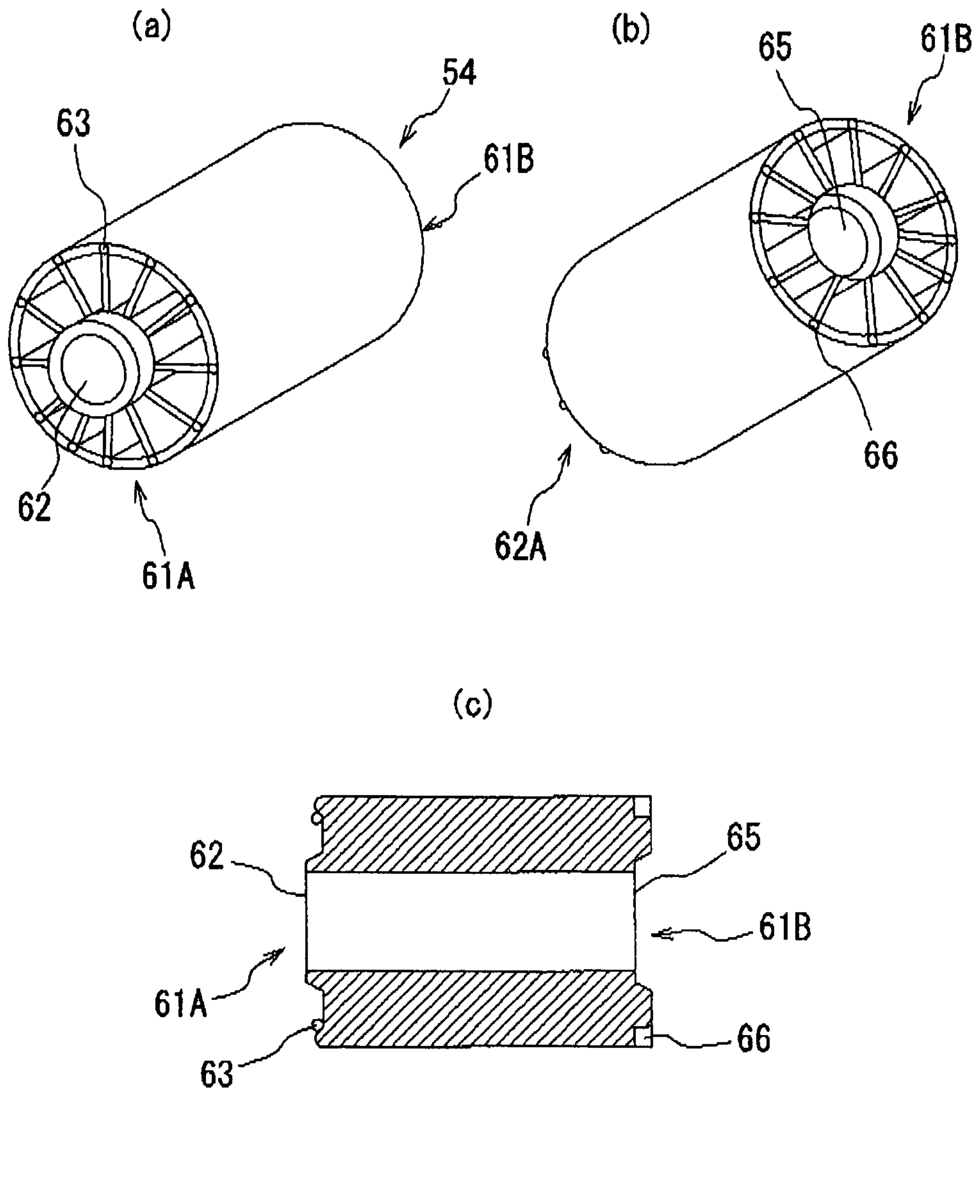
FIG. 10 is a perspective view and section view of a cylindrical body.

The means for connecting the cylindrical members 54 to each other is not particularly limited, but a structure shown in FIG. 10 can be exemplified, and the bonding can be carried out by the fitting between the end portions thereof. The illustrated cylindrical member 54 has a convex portion 62 and a rotating stop pin 63 at a side of its one end portion 61A (FIG. 10(*a*)) and a concave portion 65 and a rotating stop hole 66 at a side of the other end portion 61B (FIG. 10(*b*)). FIG. 10(*c*) is a section view of the cylindrical member 54. The cylindrical members 54 having such a structure can be strongly bonded to each other by fitting the end portion 61A into the end portion 61B at opposed state while rotating the members so as to fit the convex portion 62 into the concave portion 65 and the rotating stop pin 63 into the rotating stop hole 66, respectively. Since the roller is used under rotation, the connecting means between the members is preferable to have a rotation preventing mechanism. Moreover, the convex portion 62 and concave portion 65 are subjected to a tapering work for positioning in the illustrated cylindrical member 54.

Figure 11:
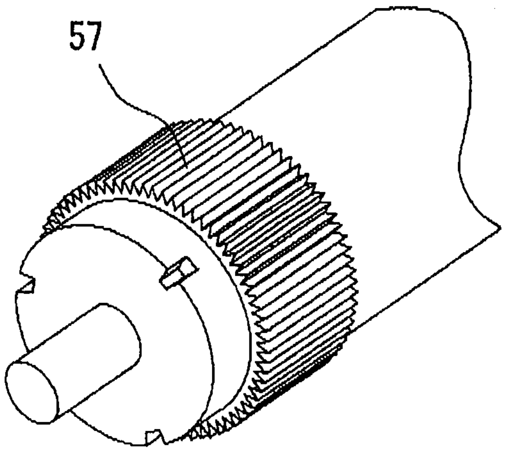
FIG. 11 is a perspective view illustrating a modified example of the shaft member shown in FIG. 9.

In the invention, the form of the shaft member 52 itself is not particularly limited, and may take a properly desired form. For example, a gear portion 57 (see FIG. 11) or a shaft portion of a proper form such as D-cut form or the like formed on the member corresponding to the end portion of the member in the longitudinal direction, or a member of only a gear portion is joined to an end portion after the formation of a roller main body, whereby the form of these functional parts can be arranged in the longitudinally end portions of the shaft member 52. Thus, there are obtained merits that it is made redundant to use the shaft separately or conduct the complicated working of the shaft and the positioning of the functional parts becomes easy.

Figure 12:
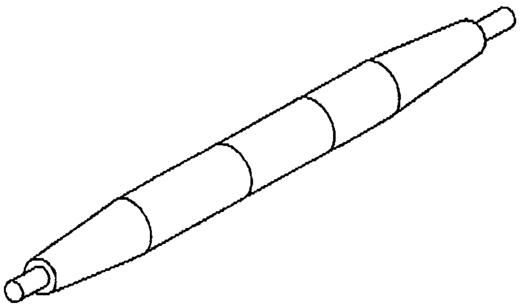
FIG. 12 is a perspective view illustrating another example of the shaft member shown in FIG. 9.

Also, the outer profile of the shaft member 52 is not limited to the cylindrical form shown in FIG. 9 and the like, and may have a crown form increasing a diameter from the longitudinally end portions toward a central portion as shown in FIG. 12. In case of the conventional integrally shaped product of the metal pipe and the resin, the outer profile of the roller main body is generally a straight cylindrical form, and is difficult to cope with the crown form in which the diameter in the central portion is larger than that of the end portion because it is required to conduct the shaping with a mold prepared in a higher production cost or to polish the elastic layer 3 or control the thickness in the formation of the coating layer 4 (dipping or the like). In this embodiment, the hollow cylindrical body 53 is divided into plural members in the longitudinal direction to lower the working level of each of the members, so that it is possible to easily cope with the crown form or the like and also it is possible to well ensure the working precision. Moreover, the number of the members constituting the roller main body is not particularly limited, and may be properly determined from a viewpoint of the strength, economical cost and the like.

As the material forming the hollow cylindrical body 53 can be used the same as previously described in the shaft member 2. As the metal shaft 56 can be used, for example, a resulphrized carbon steel, and nickel or zinc plated aluminum, stainless steel and the like.

The bonding between the hollow cylindrical body 53 and the metal shaft 56 is not particularly limited, and is usually carried out by using a conventional adhesive or the like. For example, there can be used a method wherein the hollow members 54 are heated in an oven or the like while passing the metal shaft 56 therethrough and thereafter cooled to shrink the resin material of the hollow member 54 and fix to the metal shaft 56. Furthermore, as the bonding means, it is preferable to form a groove, D-cut or the like in the metal shaft 56 (not shown). In the latter bonding means, it is preferable to have a rotation preventing mechanism likewise the previously mentioned member, which can prevent the idling of the meal shaft 56 in use.

Figure 13:
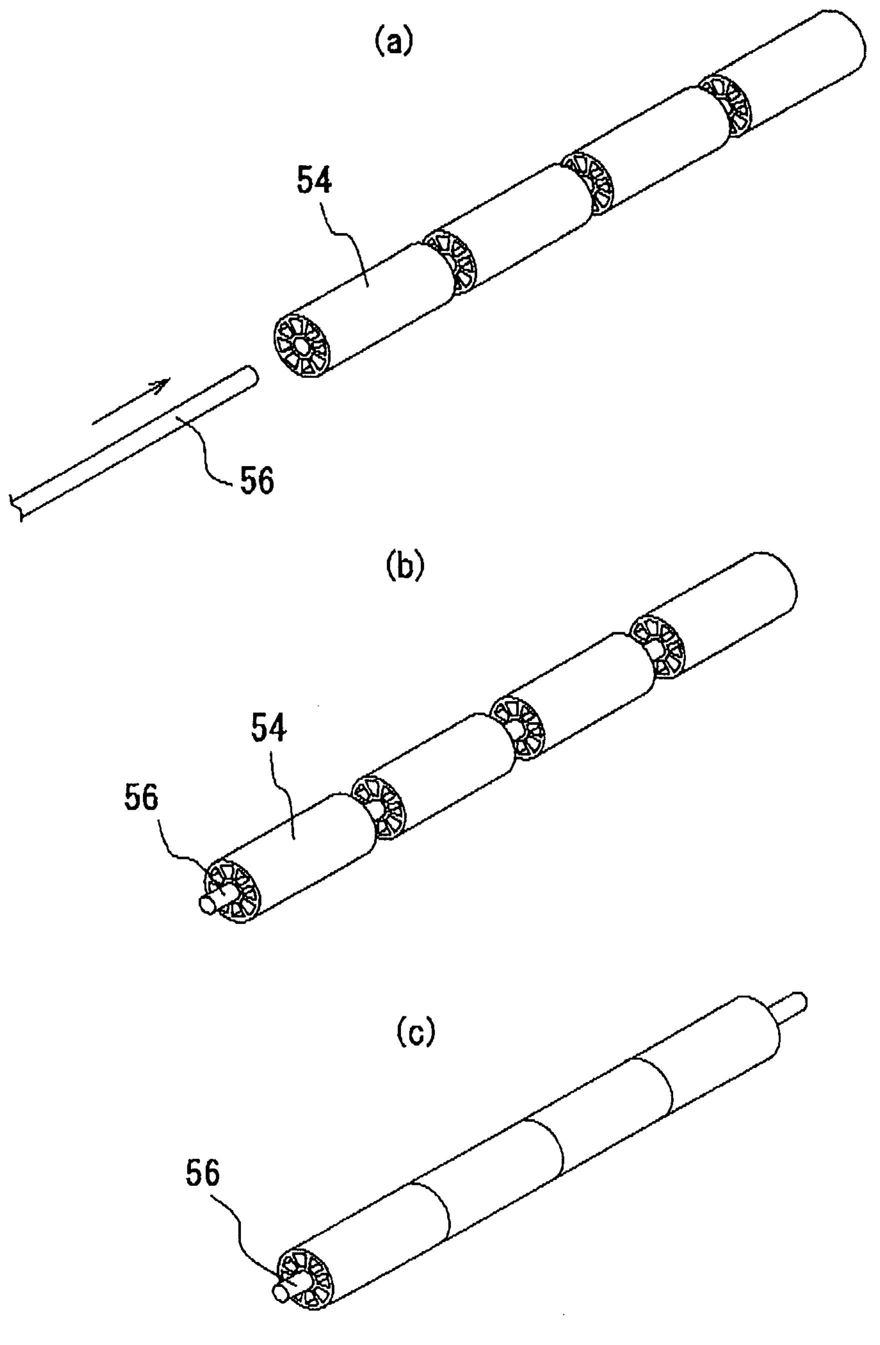
FIG. 13 is a perspective view illustrating a method of connecting cylindrical bodies.

The conductive roller 51 can be produced by connecting a plurality of cylindrical members 54 to each other in the longitudinal direction to form the shaft member 52 and then forming the elastic layer 3 on the outer periphery thereof. The procedure of forming the hollow cylindrical body 53 from the cylindrical members 54 is not particularly limited, but in case of the cylindrical members 54 having the fitting structure as shown in FIG. 10, these members may be directly bonded to each other to form the hollow cylindrical body 53. If the member has not the fitting structure, as shown in FIGS. 13(*a*)-(*c*), there may be used a method wherein the cylindrical members 54 are fixed to each other with an adhesive or the like after the metal shaft 56 is successively passed through these members 54.

In case of using the shaft member made of the metal, it is preferable to be the hollow cylindrical body as shown in FIG. 2 in view of the weight reduction. As the metal material may be exemplified a metal selected from aluminum, stainless steel, iron and an alloy including any of them.

Next, the elastic layer 3 will be described. The elastic layer 3 is made from a ultraviolet ray curing type resin containing an electrically conducting agent and a ultraviolet ray polymerization initiator or an electron beam curing type resin containing an electrically conducting agent, and has usually a glass transition point of not higher than −40° C. The formation of the elastic layer 3 is conducted by applying a compound forming an elastomer by curing through an electron beam irradiation or a ultraviolet ray irradiation onto the outside of the shaft member to form an elastomeric coating layer and then curing the elastomeric coating layer through the irradiation of an electron beam or a ultraviolet ray.

Figure 14:
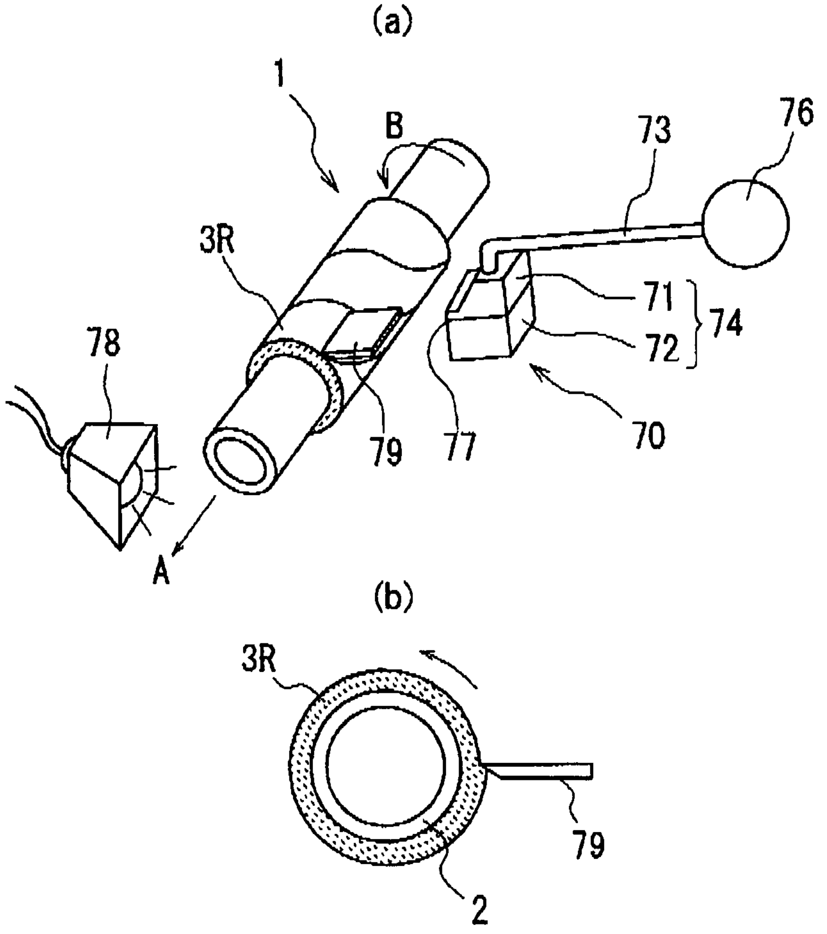
FIG. 14 is a perspective view of a forming conductive layer in the formation of a layer through a die coating method.

FIG. 14(*a*) is a perspective view of a forming conductive roller 1 when the elastic layer 3 is formed by a die coating method, and FIG. 14(*b*) is a side view of FIG. 14(*a*). This method comprises steps of discharging the compound forming an elastomer by curing through an electron beam irradiation or a ultraviolet ray irradiation onto the shaft member 2 from a discharge head 74 of a die coater 70 while rotating the shaft member 2 to form an elastomeric coating layer 3R and then curing the elastomeric coating layer 3R through the irradiation of an electron beam or a ultraviolet ray to form the elastic layer 3. The die coater 70 is constructed with the discharge head 74 consisting of divided upper die head 71 and lower die head 72, in which a feed path of the above compound is formed between the upper die head 71 and the lower die head 72 and a top of the path is provided with an opening portion 77 opened in the form of a slit. The die coater 70 is fixed at a posture of directing the opening portion 77 to an axial direction of the shaft member 2. In the thus arranged die coater 70, a paint is supplied from a constant-volume pump 76 through a feed pipe 73 to the feed path between the upper and lower die heads 71, 72 and then discharged from the opening portion 77 onto the peripheral face of the shaft member 2.

Also, a blade 79 serving as a layer-regulating means regulating in contact with the elastomeric coating layer formed by the die coater 70 before the curing is arranged in parallel to the die coater 70 together with a ultraviolet ray irradiation means or an electron beam irradiation means 78.

In the formation of the elastic layer 3, both ends of the shaft member 2 are born by a way not shown at a state of fixing the die coater 70 at a predetermined position, while the whole of the shaft member 2 is displaced in the longitudinal direction (arrow A) while rotating one of both the ends at a predetermined rotating speed by a driving means such as motor or the like (arrow B), whereby the above compound is spirally applied to form the elastomeric coating layer 3R over a full length of the shaft member 2 and the elastomeric coating layer 3R is cured by irradiating an electron beam or a ultraviolet ray through the irradiation means 78 following by the formation of the elastomeric coating layer 3R while rotating the shaft member 2. Thus, the rotating shaft member 2 is displaced to the fixed die coater 70 and the irradiation means 78 in the longitudinal direction, whereby the elastic layer 3 can be formed simply with a space-saving apparatus.

Moreover, the movement of the shaft member 2 to the die coater 70 and the irradiation means 78 is sufficient to be relative. In the illustrated embodiment is displaced the shaft member 2 in the longitudinal direction. Instead of this, or in addition to this, the die coater 70 and the irradiation means 78 may be displaced in the longitudinal direction of the shaft member.

Also, the curing of the elastomeric coating layer 3R through the ultraviolet ray irradiation or electron beam irradiation following by the formation of the elastomeric coating layer 3R is not a complete curing reaction and is sufficient to be such a semi-cured state that it is cured to an extent not hanging down in the transfer to a subsequent step. In this case, the forming conductive roller having the semi-cured elastomeric coating layer 3R is transferred to the subsequent step, at where the elastomeric coating layer 3R is full-cured by irradiating a ultraviolet ray or an electron beam with another irradiation apparatus.

By controlling the discharge amount of the compound from the discharge head 74 of the die coater 70 in a higher precision can be controlled the thickness of the elastomeric coating layer 3R in a higher precision. However, the layer regulation is carried out by scraping the surface of the layer once formed by the die coater 70, whereby the precision of the thickness of the elastomeric coating layer can be enhanced or the surface properties of the layer can be rendered into predetermined ones. For this end, a blade 70 separately arranged from the discharge head 74 (see FIGS. 14(*a*), (*b*)) can be used as the layer-regulating means as shown, for example, in FIGS. 14(*a*), (*b*). In this case, the layer regulation can be attained efficiently by continuously conducting the formation of the elastomeric coating layer 3R by the die coater 70 and the layer regulation of the formed elastomeric coating layer 3R while rotating the shaft member 2.

As another embodiment of the layer-regulating means, the discharge head 74 of a state of stopping the discharge of the compound can be used as the layer-regulating means. In this case, after the elastomeric coating layer is formed over a full length by discharging the compound from the discharge head 74 of the die coater 70, the discharge of the compound from the discharge head is stopped, and the discharge head of the state of stopping the discharge is relatively displaced as the layer-regulating means to the shaft member 2 in the longitudinal direction (A-direction or a direction opposite to A), whereby the thickness and surface smoothness of the elastomeric coating layer are adjusted to desired ones.

Figure 15:
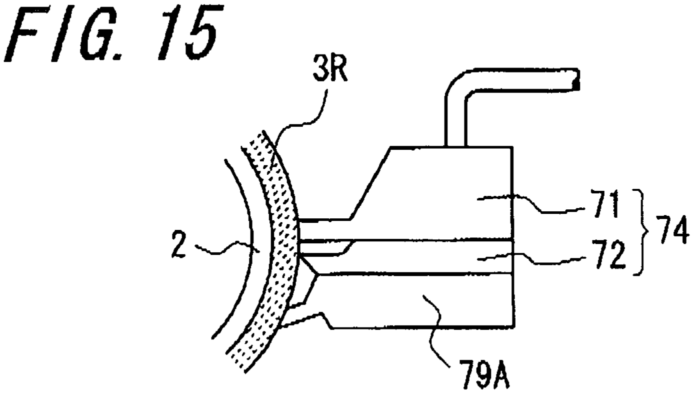
FIG. 15 is a side view illustrating another embodiment of the die coater.

Further, as shown in FIG. 15, an all-in-one blade 79A integrally attached to the discharge head 74 can be used instead of the blade 79. In this case, the compound discharged from the discharge head 74 is layer-regulated immediately after the discharge.

In order to give an electric conductivity to the elastic layer 3, an electrically conducting agent is added to the compound forming an elastomer by curing through an electron beam irradiation or a ultraviolet ray irradiation. As the electrically conducting agent may be used any of an electron conducting agent and an ion conducting agent. In case of the electron conductive agent, carbon-based conducting agents are preferable in a point that a high electric conductivity can be provided at a small addition amount. As the carbon-based conducting agent are preferably used Ketjenblack and acetylene black, but carbon blacks for rubber such as SAF, ISAF, HAF, FEF, GPF, SRF, FT, MT and the like, carbon blacks for ink such as oxidation carbon black and the like, pyrolytic carbon black, graphite and so on may also be used.

As the electron conducting agent other than the carbon-based material may be mentioned fine particles of a metal oxide such as ITO, tin oxide, titanium oxide, zinc oxide or the like; a oxide of a metal such as nickel, copper, silver, germanium or the like; a transparent whisker such as electrically conductive titanium oxide whisker, electrically conductive barium titanate whisker or the like; and so on.

As the ion conducting agent may be mentioned an organic ion conducting agent such as perchlorate, hydrochloride, borate, iodate, borofluorohydrate, sulfate, alkylsulfate, carboxylate, sulfonate and the like of ammoniums such as tetraethyl ammonium, tetrabutyl ammonium, a dodecyltrimethyl ammonium such as lauryltrimethyl ammonium or the like, hexadecyltrimethyl ammonium, an octadecyltrimethyl ammonium such as stearyltrimethylammonium or the like, benzyltrimethyl ammonium, modified aliphatic dimethylethyl ammonium and so on; and an inorganic ion conducting agent such as perchlorate, hydrochloride, borate, iodate, borofluorohydrate, trifluoromethyl sulfate, sulfonate and the like of an alkali metal or alkaline earth metal such as lithium, sodium, calcium, magnesium or the like.

As the electrically conducting agent, two or more kinds may be mixed. In this case, the electric conductivity can be stably developed even on the variation of voltage applied or change of environment. As a mixed example may be mentioned a mixture of the carbon-based conducting agent with an electron conducting agent other than the carbon-based material or an ion conducting agent.

As the compound constituting the elastic layer according to the invention and curing by the irradiation of an electron beam or a ultraviolet ray are mentioned a polyester resin, a polyether resin, a fluorine resin, an epoxy resin, an amino resin, a polyamide resin, an acrylic resin, an acrylurethane resin, a urethane resin, an alkyd resin, a phenolic resin, a melamine resin, a urea resin, a silicone resin, a polyvinylbutyral resin, a vinylether resin, a vinylester resin. They may be used alone or in a combination of two or more.

Further, there can be used a modified resin formed by introducing a specified functional group into the above resin. Also, it is preferable to introduce a group having a crosslinking structure for improving the dynamic strength and environment resistance of the resin layer 4.

Among the above compounds, a (metha)acrylate-based composition containing (metha)acrylate oligomer is particularly preferable.

As the (metha)acrylate oligomer may be mentioned a urethane-based (metha)acrylate oligomer, an epoxy-based (metha)acrylate oligomer, an ether-based (metha)acrylate oligomer, an ester-based (metha)acrylate oligomer, a polycarbonate-based (metha)acrylate oligomer, a fluorine-based (metha)acrylate oligomer, a silicone-based (metha)acrylate oligomer and so on.

The above (metha)acrylate oligomer can be synthesized by reacting a compound such as polyethylene glycol, polyoxypropylene glycol, polytetramethylene ether glycol, bisphenol A-type epoxy resin, phenol novolac type epxoy resin, addition product of polyvalent alcohol and ϵ-caprolacton or the like with (metha)acrylic acid, or by urethanating a polyisocyanate compound and a (metha)acrylate compound having a hydroxy group.

The urethane-based (metha)acrylate oligomercan be obtained by urethanating a polyol, an isocyanate compound and a (metha)acrylate compound having hydroxy group.

As an example of the epoxy-based (metha)acrylate oligomer, there may be any reaction products of compounds having glycidyl group and (metha)acrylic acid. Among them, a reaction product having a cyclic structure such as benzene ring, naphthalene ring, spiro ring, dicyclopentadiene, tricyclodecane or the like and obtained from a compound having glycidyl group and (metha)acrylic acid is preferable.

Further, the ether-based (metha)acrylate oligomer, ester-based (metha)acrylate oligomer and polycarbonate-based (metha)acrylate oligomer can be obtained by the reaction of respective polyol (polyether polyol, polyester polyol and polycarbonate polyol) and (metha)acrylic acid.

The compound is compounded with a reactive diluent having a polymerizable double bond for the adjustment of the viscosity, if necessary. As the reactive diluent can be used, for example, monofunctional, bifunctional or polyfunctional polymerizable compound having a structure that (metha) acrylic acid is bonded to an amino acid or a compound having a hydroxy group through esterification or amidation. These diluents are preferable to be usually used in an amount of 10-200 parts by weight per 100 parts by weight of the (metha) acrylate oligomer.

When the compound curing by the ultraviolet ray irradiation is used as a resin constituting the elastic layer 3, a ultraviolet initiator is included in the compound for promoting a start of a curing reaction of the resin at the forming stage.

When the carbon-based conducting agent is used as the electrically conducting agent for controlling the electric conductivity of the elastic layer 3, there is a possibility that the ultraviolet ray irradiating for the curing is obstructed by the electrically conducting agent so as not to arrive in the back of the layer, and hence the ultraviolet initiator can not develop its function sufficiently and the curing reaction becomes not proceeding sufficiently.

In order to absorb a long-wavelength ultraviolet ray capable of penetrating into the back of the layer, as the ultraviolet initiator are preferably used compounds having a maximum wavelength in a ultraviolet ray absorbing wavelength zone of not less than 400 nm. As such a ultraviolet initiator can be used α-aminoalkyl phenone, acylphosphine oxide, thioxthantone and the like. As a concrete example of the initiator may be mentioned bis(2,4,6-trimethylbenzoyl)-phenyl phosphine oxide or 2-methyl-1-[4-(methylthio)phenyl]-2-morpholinopropane-1-on.

Also, it is preferable to include a short wavelength compound having a maximum wavelength in the ultraviolet ray absorbing wavelength zone of less than 400 nm in addition to the long wavelength compound having a maximum wavelength in the ultraviolet ray absorbing wavelength zone of not less than 400 nm. In this case, the curing reaction can well proceed in not only the back of the layer but also the neighborhood of the surface of the layer in case of using the carbon-based conducting agent.

As the ultraviolet initiator having such a short wavelength absorbing zone may be mentioned 2,2-dimethoxy-1,2-diphenylethane-1-on, 1-hydroxy-cyclohexyl-phenylketone, 2-hydroxy-2-methyl-1-phenylpropane-1-on, 1-[4-(2-hydroxyethoxy)phenyl]2-hydroxy-2-methyl-1-propane-1-on and the like.

Moreover, if the carbon-based material is not used as the electrically conducting agent, the ultraviolet initiator can be selected independently of the maximum wavelength in the ultraviolet ray absorbing wavelength zone. For example, it may be selected from the aforementioned ones.

The amount of the ultraviolet initiator compounded is preferable to be 0.1-10 parts by weight per 100 parts by weight of, for example, (metha)acrylate oligomer.

In the invention, the compound curing by the ultraviolet ray may be added with a tertiary amine such as triethylamine, triethanolamine or the like, an alkylphosphine-based photopolymerization promoter such as triphenyl phosphine or the like, a thioether-based photopolymerization promoter such as p-thiodiglycol or the like, and so on in addition to the above components for promoting the polymerization reaction with the above initiator, if necessary. The amount of these compounds added is preferable to be usually a range of 0.01-10 parts by weight per 100 parts by weight of the (metha)acrylate oligomer.

In the compound curing by the ultraviolet ray or electron beam may be included a reaction diluent in addition to the electrically conducting agent, if necessary.

Since the elastic layer 3 is used in contact with a photosensitive body, a stratification blade or the like directly or indirectly through the coating layer 4, even if the hardness is set to a low level, a compression permanent strain is preferable to be made as small as possible, and concretely it is not more than 20%.

As mentioned above, the elastic layer 3 is constituted with the ultraviolet ray curing type resin or the electron beam curing type resin. That is, the elastic layer 3 is formed by applying a paint without using the mold, which is designed for the purpose of making the drying step useless to reduce the equipment cost. For this end, it is required that a solvent-free or low-solvent paint is used and can be cured only by irradiating the ultraviolet ray or the electron beam. In this case, the paint becomes necessarily high in the viscosity.

Therefore, as the method of forming the elastic layer 3, it is required to use a method capable of applying the paint having such a high viscosity in a high precision. For this end, the previously mentioned die coating method becomes preferable.

The coating layer 4 is described below. The coating layer 4 can be made from various resins, but is preferable to be made from a ultraviolet ray curing type resin containing an electrically conducting agent and a ultraviolet initiator or an electron beam curing type resin containing an electrically conducting agent in a point that the equipment cost can be reduced. As the method of forming the coating layer 4, it is preferable that the paint made of the above resin is applied onto a peripheral face of a conductive roller provided with the elastic layer 3 to form a coating applied layer and then the coating applied layer is cured by irradiating an electron beam or a ultraviolet ray, whereby a mold for forming the coating layer 4 and a drying apparatus can be made needless.

Figure 16:
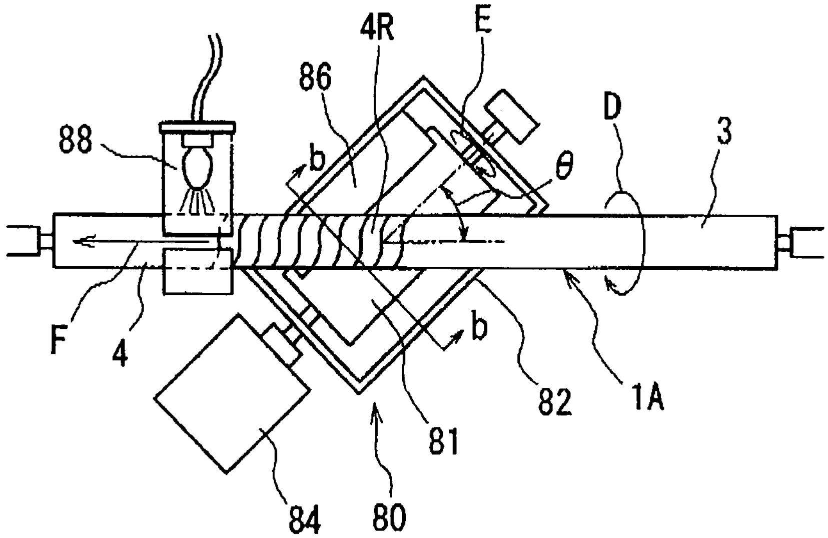
FIG. 16 is a plan view and a fragmentary view illustrating a forming conductive roller in the formation of a layer through a roll coating method.
Figure 16:
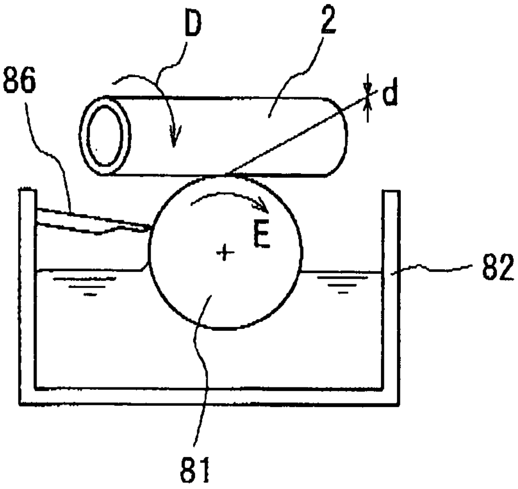

FIG. 16(*a*) is a perspective view of a forming conductive roller when the coating layer 4 is formed by a roll coating method, and FIG. 16(*b*) is a fragmentary view of a layer-regulating blade viewed from an axial direction of the conductive roller in FIG. 16(*a*). The roller coater 80 comprises a coating roll 81 immersed in the paint stored in a paint tank 82 and a roll driving motor 84 rotating the coating roll 81 (direction E), while the conductive roller 1A provided with the elastic layer 3 is born at both ends by a means not shown and is constructed so as to displace the whole of the conductive roller 1A in the axial direction (arrow F) while one of both the ends is rotated by a driving motor or the like at a predetermined rotating speed (arrow D). Further, the ultraviolet ray irradiation means or electron beam irradiation means 88 is fixedly arranged in parallel to the roll coater 80.

The surface of the coating roll 81 is directly contacted with the peripheral face of the forming conductive roller 1A or close thereto through a predetermined gap d, and the paint drawn by the peripheral face of the coating roll 81 is transferred onto the peripheral face of the conductive roller 1A, whereby the coating applied layer 4R can be formed. At this moment, the axial line of the coating roller 81 is arranged so as to incline at an angle θ with respect to the axial line of the conductive roller 1A, and the conductive roller 1A is rotated and displaced in the axial direction (longitudinal direction), whereby the paint is spirally applied to form the coating applied layer 4R over the full peripheral face of the conductive roller 1A provided with the elastic layer 3, while the coating applied layer 4R can be cured continuously by the irradiation means 78 while rotating the conductive roller 1A just after the formation to form a coating layer 4. In this case, the installation for forming the elastic layer 3 can also be made simple, space-saving and cheap.

The curing of the coating applied layer 4R by the irradiation means 78 can attain the full curing if the coating layer 4 is a thin layer, but when the curing is insufficient only at this step, a step for the complete curing may be disposed separately. Moreover, the curing is finished to an extent required for the transportation to a subsequent step only at this step, so that there are not caused problems such as deformation on the way of the transportation and the like.

By inclining the axial line of the coating roll 81 at the angle θ with respect to the axial line of the conductive roller 1A can be prevented the occurrence of departure line formed when the roll and the roller are arranged in parallel and separated away from each other. Also, a doctor blade 86 regulating the amount of the paint drawn by the coating roll 81 is arranged in the roll coater 80, whereby the thickness of the coating applied layer 4R formed on the conductive roller 1A can be controlled in a higher precision. Further, gravure-like unevenness is formed in the peripheral face of the coating roll 81, whereby the amount of the paint drawn can be ensured and also the amount of the paint applied onto the shaft member 2 can be controlled in a high precision.

Figure 17:
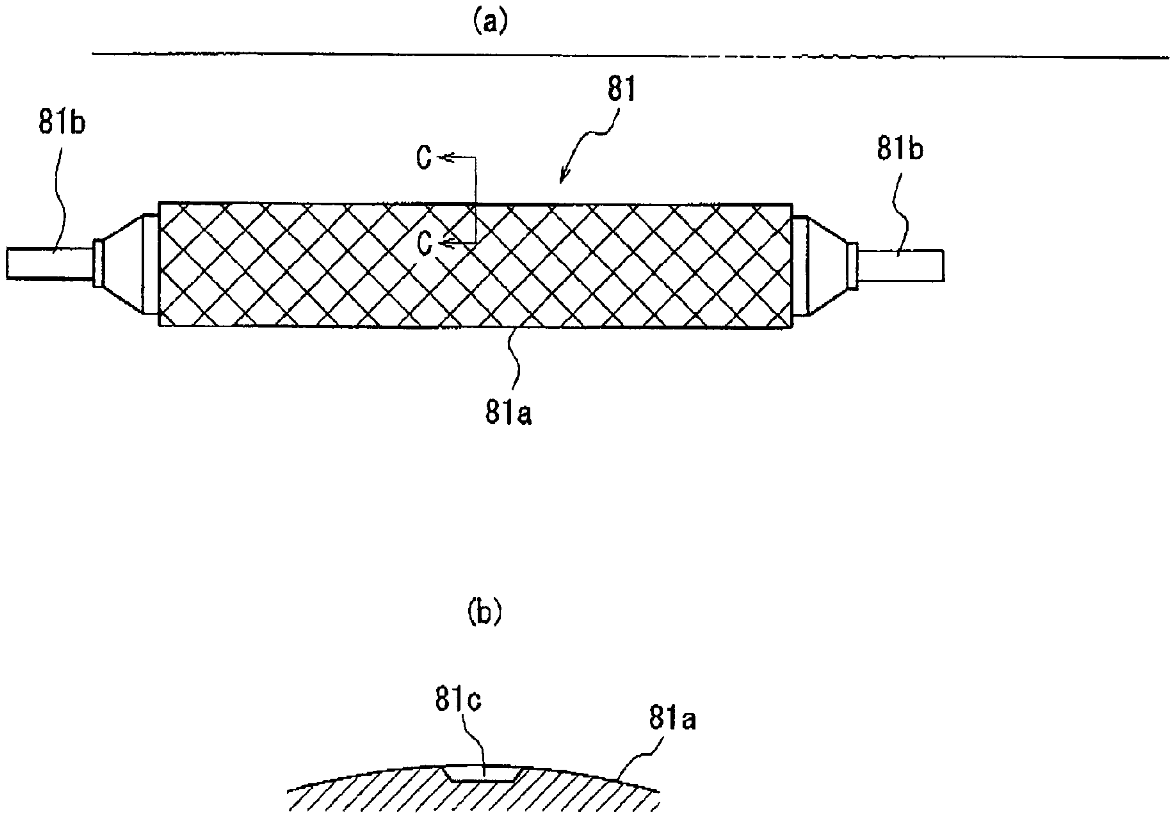
FIG. 17 is a plan view and a section view of a gravure roll.

FIG. 17 is a diagram illustrating the coating roll 81 having gravure-like unevenness on its peripheral face (hereinafter referred to as gravure roll), in which FIG. 17(*a*) is a front view and FIG. 17(*b*) is a section view taken along an arrow c-c of FIG. 17(*a*). The gravure roll 81 is a roll made of a metal such as iron or the like and is rotated while bearing at both longitudinal end portions 81*b*. On the peripheral face 81*a* drawing the paint from the tank 82 and transferring it are formed gravure-printed concave portions 81*c*, and the paint drawn by the peripheral face 81*a* are scraped down by the doctor blade 86. A predominant factor deciding the transfer amount of the paint by the gravure roll 81 is the rotating number and the total volume of the concave portions 81*c*, which can be made higher in the precision as compared with the case of applying with a flat roll having no concave portion 81*c*.

When the paint kept by the concave portions 81*c* is transferred onto the peripheral face of the forming conductive roller 1A, the transfer amount is affected by the viscosity of the paint, but us predominantly decided by the shape of the concave portion 81*c*. Even in this point, the coating layer 4 can be formed on the elastic layer 3 at a higher precision as compared with the case of using the flat roll.

Figure 18:
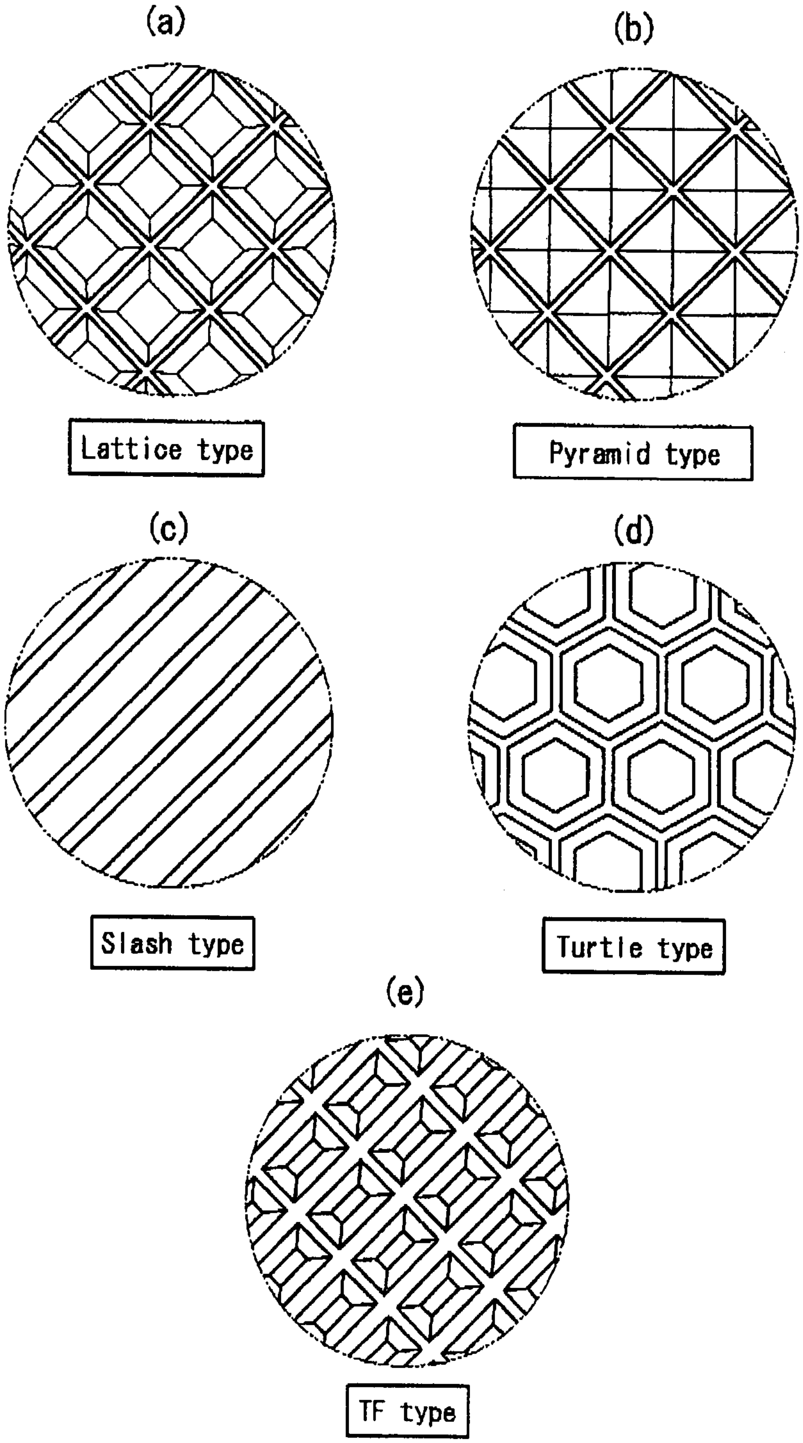
FIG. 18 is a diagrammatic view illustrating examples of gravure printed patterns by a gravure roll.

In FIG. 18 are schematically shown examples of gravure-printed patterns. There may be mentioned patterns of lattice type, pyramid type, slash type, turtle type and TF type shown in FIGS. 18(*a*)-(*e*) in this order, and among them the lattice type, pyramid type and slash type are preferably used. For example, when using the gravure-printed pattern of lattice type, it is preferable that the lattice density is 10-300 lattices/inch and the depth is 20-650 μm and the volume of the concave portion is 5-400 $cm^3/m^2$ for ensuring the thickness in a high precision.

When the coating layer 4 is made from the ultraviolet ray curing type resin containing an electrically conducting agent and a ultraviolet initiator or the electron beam curing type resin containing an electrically conducting agent, there can be used the same of the resin, electrically conducting agent and ultraviolet initiator as described in the elastic layer 3.

At this moment, in order to obtain the desired surface properties such as assurance of transferring force of toner carried on the outer peripheral face of the developing roller to the latent image support and the like, the unevenness can be formed on the peripheral face of the conductive roller 1 by dispersing micro-particles into any of the layers. However, when the micro-particles are dispersed into the outermost layer, the micro-particles are directly contacted with the photosensitive drum or the like, whereby there is caused a possibility that the micro-particles are worn or the properties of the micro-particles are changed, so that the micro-particles are preferable to be dispersed in an inside layer adjacent to the outermost layer. In the conductive roller 1 having one coating layer 3, therefore, they are preferable to be disposed in an outermost elastic layer 3.

Moreover, when the total thickness of the elastic layer is large, it is preferable that the elastic layer is divided into plural layers and the micro-particles are disposed in only an outermost divided layer, whereby the bad influence of the dispersion of the micro-particles on the properties inherent to the elastic layer can be suppressed.

As the micro-particles are preferable micro-particles of rubber or a synthetic resin, and carbon micro-particles. Concretely, there are preferable micro-particles of one or more of silicone rubber, acrylic resin, styrene resin, acryl/styrene copolymer, fluorine resin, urethane elastomer, urethane acrylate, melamine resin, epoxy resin, phenolic resin and silica.

The amount of the micro-particles added is preferable to be 0.1-100 parts by weight, particularly 5-80 parts by weight per 100 parts by weight of the resin.

Industrial Applicability

The conductive roller according to the invention is preferably used as a charge roller, a conductive roller, a transfer roller, a conductive roller, a middle transfer roller, a toner feed roller, a cleaning roller, a belt driving roller, a paper feed roller or the like by mounting in an imaging apparatus such as a plain paper copier, a plain paper facsimile, a laser beam printer, a color laser beam printer, a toner jet printer or the like.

The invention claimed is:

1. A method of producing a conductive roller comprising a shaft member axially bearing at both end portions in its longitudinal direction and one or more elastic layers arranged outside in a radial direction thereof, which comprises applying a compound forming an elastomer by curing through an electron beam irradiation or a ultraviolet ray irradiation onto an outside of the shaft member to form an elastomeric coating layer and then curing the elastomeric coating layer through an irradiation of an electron beam or a ultraviolet ray to form an elastic layer, wherein the compound is discharged through a discharge head of a die coater and spirally applied onto the shaft member while rotating the shaft member to form the elastomeric coating layer over a full length of the shaft member, wherein at least one of the shaft member and a layer-regulator that contacts with the elastomeric coating layer formed by the die coater before the curing while rotating the shaft member, is relatively displaced in the longitudinal direction of the shaft member to adjust a thickness and a surface smoothness of the elastomeric coating layer, wherein when the elastomeric coating layer is cured by irradiating the electron beam or the ultraviolet ray, an apparatus for irradiating the electron beam or the ultraviolet ray is relatively displaced to the shaft member in the longitudinal direction while rotating the shaft member to semi-cure the elastomeric coating layer, and then the elastomeric coating layer is full-cured at a subsequent step in the step of forming the elastomeric coating layer, and the semi-curing of the elastomeric coating layer is continuously conducted with the application of the elastomeric coating layer while rotating the shaft member, and wherein the layer-regulator is separately disposed from the discharge head, and the formation of the elastomeric coating layer and the layer regulation of the elastomeric coating layer formed are continuously conducted as the shaft member is rotated.

2. A method of producing a conductive roller according to claim 1, wherein the die coater has a discharge head having a length shorter than that of the elastomeric coating layer and at least one of the discharge head and the shaft member is relatively displaced in the longitudinal direction of the shaft member to form the elastomeric coating layer.

3. A method of producing a conductive roller according to claim 1, wherein the layer-regulator is a discharge head being at a state of stopping a discharge of the compound after the elastomeric coating layer is formed over a full length by discharging the compound through the discharge head of the die coater, and at least one of the layer-regulator and the shaft member is relatively displaced in the longitudinal direction of the shaft member to adjust a thickness and a surface smoothness of the elastomeric coating layer to predetermined values.

4. A method of producing a conductive roller according to claim 1, wherein the layer-regulator is attached to the discharge head.

5. A method of producing a conductive roller according to claim 1, wherein a paint curing through the electron beam irradiation or the ultraviolet ray irradiation is applied onto the surface of the elastomeric coating layer to form a coating applied layer, and the electron beam or the ultraviolet ray is irradiated to the coating applied layer to form a cured coating layer.

6. A method of producing a conductive roller according to claim 5, wherein the coating applied layer is formed by crossing a coating roll of a roll coater with a forming conductive roller at a predetermined angle inclusive of 90° at a posture of contacting or approaching peripheral faces of both the rollers with each other while feeding the paint onto the peripheral face of the coating roll and relatively displacing at least one of the coating roll and the forming conductive roller to the other in a longitudinal direction of the conductive roller while rotating both the coating roll and the forming conductive roller.

7. A method of producing a conductive roller according to claim 6, wherein a gravure roll is used as the coating roll.

8. A method of producing a conductive roller according to claim 5, wherein when the coating applied layer is cured by irradiating the electron beam or the ultraviolet ray, an apparatus for irradiating the electron beam or the ultraviolet ray is relatively displaced to the forming conductive roller in the longitudinal direction while rotating the forming conductive roller to semi-cure the coating applied layer, and then the coating applied layer is full-cured at a subsequent step in the step of forming the coating applied layer, and the semi-curing of the coating applied layer is continuously conducted with the application of the coating applied layer while rotating the shaft member.

9. A method of producing a conductive roller according to claim 1, wherein a metal pipe, or a hollow cylindrical body or a solid cylindrical body of a resin containing an electrically conducting agent is used as the shaft member.

* * * * *